United States Patent
Schwarz

[15] 3,681,569
[45] Aug. 1, 1972

[54] HEAT CONTROL SYSTEM
[72] Inventor: John F. Schwarz, Affton, Mo.
[73] Assignee: Hercules Galion Products, Inc., Galion, Ohio
[22] Filed: Dec. 22, 1967
[21] Appl. No.: 692,769

[52] U.S. Cl. ..............219/492, 219/501, 219/511, 337/103
[51] Int. Cl. ...........................................H05b 1/02
[58] Field of Search......219/240, 492, 493, 494, 501, 219/513, 511; 337/103

[56] References Cited

UNITED STATES PATENTS

| | | | |
|---|---|---|---|
| 1,581,429 | 4/1926 | Donle | 219/494 |
| 3,305,766 | 2/1967 | Gambill | 219/501 |
| 3,419,708 | 12/1968 | Niewyk et al. | 219/501 |
| 3,180,999 | 4/1965 | Kuykendall | 219/501 |
| 3,315,891 | 4/1967 | Allen | 219/501 |
| 3,364,338 | 1/1968 | Hoztkamp | 219/501 |
| 3,301,481 | 1/1967 | Amy et al. | 219/501 |
| 2,705,276 | 3/1955 | Wise | 219/511 |
| 3,247,358 | 4/1966 | Schmidt | 219/240 |

Primary Examiner—Bernard A. Gilheany
Assistant Examiner—F. E. Bell
Attorney—Rogers, Ezell, Eilers & Robbins

[57] ABSTRACT

A novel method of and a novel unit for controlling the heat input and the operating temperature of an electric heating element, such as those of an electric broiler, or the like, the method including cyclically alternately supplying full current and a predetermined less amount of current to such electric heating element, the unit comprising an adjustable proportionate timer and a diode electrically connected between the electric element and a power supply to accomplish said method.

6 Claims, 1 Drawing Figure

PATENTED AUG 1 1972
3,681,569
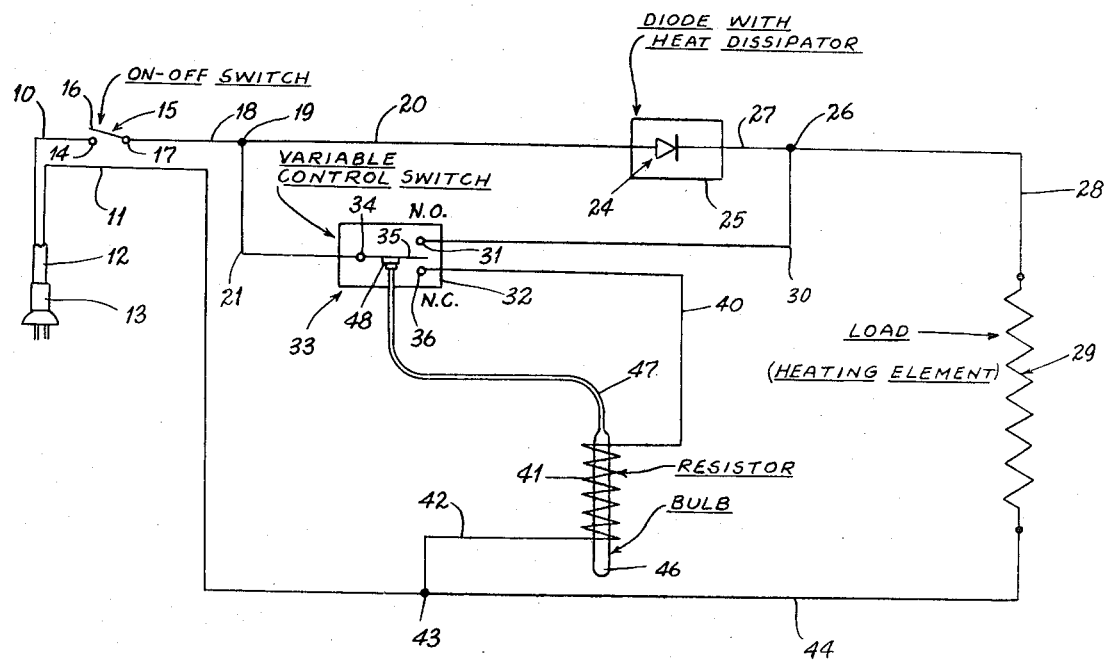
INVENTOR:
JOHN F. SCHWARZ
BY Kingsland, Rogers, Ezell, Eilers & Robbins
ATTORNEYS

HEAT CONTROL SYSTEM

BACKGROUND OF THE INVENTION

1. Field of the Invention

The present invention relates generally to the electric heating art, and more particularly to a novel method of and novel unit for controlling the heat input and the operating temperature of an electric heating element, such as those of an electric broiler, and the like.

2. Description of the Prior Art

Heretofore, electric heating elements or units, as those of electric broilers, have been energized through cycling on and off switches. That is, full current is alternately supplied and denied to the electric heating unit or units, a switch being automatically turned on and off to effect this. Particularly with commercial broilers, for example, in such type of operation the switches do not last long, the cooking temperature follows a wide temperature range, and the heating units have shorter lives. Many efforts have been made to find a solution to the problem without success.

SUMMARY OF THE INVENTION

In brief, the present novel method of controlling the heat input and the operating temperature of an electric element, as of an electric broiler, comprises cyclically supplying to the electric element or unit electric current at full load and partial load, preferably automatically. The present novel unit in a preferred embodiment includes a proportionate timer which may comprise a switch, bulb and heating element therefor, and capillary tube with fluid connected between bulb and switch, and means for adjusting the operative setting of the timer, a diode, and electrical connections.

Objects of the present invention are to provide a novel method of and a novel unit for better controlling the heat input and the operating temperature of an electric element, such as those of an electric broiler, and the like, which are highly effective for the intended purposes, which increase the effective average temperature of the heated space, as of a broiler, which decrease the temperature spread of the heated space, which materially increase the life of the control unit and of the electric element, which eliminate extreme high and low temperatures in the heated space, and which otherwise fulfill the objects and advantages sought therefor.

BRIEF DESCRIPTION OF THE DRAWING

The drawing is a wiring diagram illustrating a preferred embodiment of the present novel unit for accomplishing the present novel method, the general parts of the novel unit being diagrammatic.

DESCRIPTION OF THE PREFERRED EMBODIMENT

Referring more particularly to the drawing, the wiring diagram shown includes power supply lines 10 and 11 which may be connected into a cord 12 having the usual plug 13 or may terminate at a terminal block to which a source of power is adapted to be connected. The line 10 is connected to one terminal 14 of an on-off switch generally designated 15. A circuit closing and opening switch blade 16 is pivotally mounted on the other terminal 17. A line 18 joins the terminal 17 with a juncture 19 to which is connected lines 20 and 21.

The line 20 is connected to one side of a diode 24 mounted on a heat sink or dissipator 25. The diode 24 may be a silicon rectifier, such as is made and sold by Mallory Semiconductor Co., Division of P. R. Mallory & Co., under the identification I N 3663 M 6419. The diode 24 may take other forms or other adaptable structures may be employed. A juncture terminal 26 is connected by a line 27 to the diode 24, by a line 28 to one side of the heating unit or units 29 of an electric broiler, or the like, and by a line 30 to the normally open terminal 31 of a microswitch 32, or the like, of an adjustable infinite control or proportionate timer unit 33. The disclosed infinite control which is used by applicant is made by Diatemp, Inc., St. Louis, Mo. Other types of infinite control units are suitable. A common terminal 34 of the switch 32 receives the other end of the line 21. A switch blade 35 is pivotally mounted on the terminal 34 for movement between the normally open terminal 31 and a normally closed terminal 36.

A line 40 connects the normally closed terminal 36 with one side of a small heater or resistor 41, the other side being connected by a line 42 to a juncture terminal 43 to which are also connected the line 11 and a line 44 which runs to the other side of the heating unit or units 29. The heater 41 surrounds a bulb 46 to which is connected a capillary tube 47 which with the heater 41 form part of the unit 33. The other end of the capillary tube 47 includes a standard fitting 48, as a hydraulic bellows, also as part of the unit 33, which is insulatively connected to the blade 35 for positive movement thereof into engagement with the normally open terminal 31 upon expansion of fluid in said bulb 46 and tube 47 on energization of the heater 41, and positive movement into engagement with the normally closed terminal 36 upon contraction of the fluid. It will be understood that the unit 33 is adjustable for predetermining the time on full current and the time on half current per cycle for obtaining the required average temperature.

Summarizing the operation of the present novel unit in accomplishing the present novel method, assuming the plug 13 is connected to a source of power, closing the on-off switch 15 will energize the circuit through the diode 24 and through the heating unit or units 29 supplying current at substantially half-load through the nature of the diode 24, and will energize the circuit through the proportionate timer unit 33 which includes the normally closed contact 36 and the small heater 41. Energization of this circuit through the heater 41 warms up the bulb 46 and expands the fluid therein into and through the capillary tube 47 to move the switch blade 35 in a predetermined timed relationship from engagement with the normally closed terminal 36 to engagement with the normally open terminal 31. The shunt circuit is thereby completed around the diode 24, through which full current passes to the heating unit or units 29, as is clear from the drawing. When the fluid in the bulb 46 and the capillary tube 47 has cooled to a predetermined degree, in effect through the medium of the engagement of the fitting 48 with the blade 35, the blade 35 is moved from engagement with the normally open terminal 31 to engagement with the normally closed terminal 36, thereby again energizing the heater 41 circuit and opening the shunt circuit around the diode 24 to permit the main current to pass therethrough, so that substantially half current again reaches the heating unit or units 29.

It is clear from the foregoing that the line current to the heating unit or units 29 is supplied in a predeterminately timed cycle of full current and half current, so that a variable average temperature of from substantially one-half current to substantially full current input is maintained. A greatly improved temperature control curve is obtained in the employment of the present invention. Tests show that under comparable circumstances, an average standard prior art on and off control for electric heating units, as in an electric broiler, will cycle 10 to 12 times during one cycle of the present invention set for a period of substantially 4 minutes. Thus, the switch employed in the present invention will function up to 10 to 12 times as long as that of the standard on-off control. Because the electric heating unit 29 is subjected to less stress in operating under a narrower range of temperature, it will last longer with the present control.

It is manifest that there has been provided a novel method of and unit for controlling the heat input and the operating temperature of an electric broiler which fulfills the objects and advantages sought therefor.

It is to be understood that the foregoing description and the accompanying drawing have been given by way of illustration and example. It is also to be understood that changes in the steps and in form of the elements, rearrangement of steps and of parts, and substitution of equivalent steps and elements, which will be obvious to those skilled in the art, are contemplated as within the scope of the present invention which is limited only by the claims which follow.

What is claimed is:

1. The method of controlling the heat input and the operating temperature of an electric heating element of an electric broiler and the like comprising the steps of supplying full line alternating current to such electric heating element for a predetermined period of time, then supplying a predetermined percentage of said line current to such electric heating element for a predetermined period of time by changing the path of flow of said current to the electric heating element and passing said current through a diode ahead of said electric heating element by moving a proportionate timer switch from one operative position shunting the diode to a second operative position passing said current through the diode by means of a temperature sensing means actuated by heating means in a line shunted across the power supply ahead of said heating element having a heating phase and a cooling phase, specifically, by permitting the temperature sensing means to cool to move the proportionate timer switch from diode shunting position to position passing said current therethrough and to energize the heating means, then heating the temperature sensing means to move the proportionate timer switch back to diode shunting position and to deenergize the heating means to supply full current to the heating element, and thereafter cyclically alternately repeating said steps thereby to control the heat input and the operating temperature of such electric heating element substantially independently of surrounding temperatures.

2. The method of claim 1 in which the step of supplying a predetermined percentage of line current is the supplying of substantially half line current.

3. The method of claim 1 and including the preliminary step of establishing the time duration of each heating step prior to initiation of the cycle.

4. The method of claim 2 and including the preliminary step of establishing the time duration of each heating step prior to initiation of the cycle.

5. In combination with an electric heating element of an electric broiler, a unit for controlling the heat input and the operating temperature of said electric heating element comprising a proportionate timer having a switch having two operative positions of movement, a diode, means electrically connecting said proportionate timer, said diode, and said electric heating element to cyclically alternately supply full line alternating current and substantially half line alternating current to such electric heating element, and a temperature sensing means having heating means shunted directly across the power supply, said switch being operated by the said sensing means to disconnect said shunted heating means and to short circuit said diode, said diode being in series with said electric heating element in one position of movement of said switch to supply said substantially half line current to said electric heating element and being shunted out of said electric heating element circuit in the other position of movement of said switch, said switch in said other position of movement connecting said electric heating element to said full line current.

6. The combination of claim 5 in which said proportionate timer is adjustable to vary the time of full current and of half current to said electric heating element.

* * * * *